US006973399B1

(12) United States Patent
Burgschat et al.

(10) Patent No.: US 6,973,399 B1
(45) **Date of Patent: *Dec. 6, 2005**

(54) METHOD AND CIRCUIT FOR CORRECTING PERIODIC SIGNALS OF AN INCREMENTAL POSITION MEASURING SYSTEM

(75) Inventors: Reiner Burgschat, Jena (DE); Mathias Krauss, Ammerbuch (DE)

(73) Assignee: Dr. Johannes Heidenhain GmbH, Traunrauti (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/958,039

(22) PCT Filed: Mar. 22, 2000

(86) PCT No.: PCT/EP00/02576

§ 371 (c)(1), (2), (4) Date: Feb. 26, 2002

(87) PCT Pub. No.: WO00/60314

PCT Pub. Date: Oct. 12, 2000

(30) Foreign Application Priority Data

Mar. 30, 1999 (DE) ........................................ 199 14 388

(51) Int. Cl.[7] ................................................ G01R 35/00

(52) U.S. Cl. ......................... 702/106; 702/106; 702/57; 702/66; 702/71; 327/33; 327/91; 331/7; 331/106; 330/9; 330/135; 330/136

(58) Field of Search ............................. 702/57, 66, 67, 702/70, 71, 73, 74, 87, 106, 116, 124, FOR 108, 104, 107, 110, 135, 164, 170, 171; 327/33, 91, 232, 317, 331, 341; 331/7, 106, 177; 330/9, 135, 136

(56) References Cited

U.S. PATENT DOCUMENTS 4,458,322 A 7/1984 Veale
4,473,797 A 9/1984 Shiota (Continued)

FOREIGN PATENT DOCUMENTS

DE 34 14 155 A1 10/1986
DE 37 11 062 C2 6/1989

(Continued)

OTHER PUBLICATIONS

Karlsson et al., Design and Implementation of a Complex Multiplier Using Distributed Arthmetic, Jan. 1997, vol.: 3806, pp.: 222–231.*

(Continued)

*Primary Examiner*—Marc S. Hoff
*Assistant Examiner*—Elias Desta
(74) *Attorney, Agent, or Firm*—Brinks Hofer Gilson & Lione

(57) ABSTRACT

A circuit arrangement for the correction of periodic signals from an incremental position measuring system that includes a first assembly comprising a multiplexer having an input to which a periodic signal is supplied and an output out of which an output signal is transmitted, a second assembly that receives the output signal and compares the output signal with at least one preset threshold value and, the second assembly selects a manipulated variable as a function of an actual position of a signal parameter in relation to the at least one preset threshold value from at least two preset, different manipulated variables and an actuating member that performs an action on the signal parameter in order to adjust the signal parameter in a direction toward a preset setpoint value.

64 Claims, 7 Drawing Sheets

U.S. PATENT DOCUMENTS

| | | | | |
|---|---|---|---|---|
| 4,618,940 A | | 10/1986 | Schmitt | |
| 4,678,948 A | | 7/1987 | Schmitt | |
| 4,739,164 A | | 4/1988 | Burkhardt | |
| 4,739,197 A | | 4/1988 | Schmitt | |
| 4,961,206 A | * | 10/1990 | Tomlinson et al. | 375/39 |
| 5,192,917 A | | 3/1993 | Schweigert et al. | |
| 5,239,307 A | | 8/1993 | Andermo | |
| 5,299,143 A | | 3/1994 | Hellinga et al. | |
| 5,453,684 A | | 9/1995 | Nakayama | |
| 5,485,407 A | | 1/1996 | Ishimoto et al. | |
| 5,612,906 A | | 3/1997 | Gotz | |
| 5,625,310 A | | 4/1997 | Takeishi | |
| 5,663,643 A | | 9/1997 | Matuyama | |
| 5,719,789 A | * | 2/1998 | Kawamata | 364/561 |
| 5,724,035 A | | 3/1998 | Sakuma | |
| 5,867,508 A | * | 2/1999 | Piret | 371/37.01 |
| 5,943,639 A | | 8/1999 | Tanaka et al. | |
| 5,956,659 A | | 9/1999 | Spies et al. | |

FOREIGN PATENT DOCUMENTS

| | | |
|---|---|---|
| DE | 31 51 743 | 3/1990 |
| DE | 690 14 577 T2 | 7/1995 |
| DE | 43 31 151 C2 | 5/1997 |
| DE | 195 44 948 | 6/1997 |
| DE | 196 43 771 | 10/1997 |
| DE | 197 12 622 | 10/1998 |
| EP | 0 331 189 | 9/1989 |
| EP | 0 478 394 | 4/1992 |
| EP | 0 489 936 | 6/1992 |
| EP | 0 588 549 | 3/1994 |
| EP | 0 599 175 | 6/1994 |
| EP | 0 704 679 | 4/1996 |
| EP | 0 708 311 | 4/1996 |
| JP | 02309280 A | 12/1990 |

OTHER PUBLICATIONS

C. Gille et al., "Lehrgang der Regelungstechnik," vol. 1, 3rd Edition, published by VEB Verlag Technik, Berlin, 1964, pp. 8–13.

"Meyers Neues Lexikon," vol. 11, published by VEB Bibliographisches Institut, Leipzig, 1975, pp. 416–417.

Karl Reinisch, "Analyse und Synthese kontinuierlicher Steuerungssysteme," 2nd Edition, published by VEB Verlag Technik, Berlin, 1982, pp. 203–204 and 210–212.

Dieter Schulz, "Praktische Regelungstechnik—Ein Leitfaden fur Einsteiger," published by Huthig Buch Verlag GmbH, Heidelberg, 1994, pp. 20–29.

DIN 19226 publication, published by DIN, publication date unknown and so it is unknown if published prior to German priority date of Mar. 30, 1999, pp. 3–5 and 7–9.

Patent Abstracts of Japan, published by European Patent Office, vol. 015, No. 099 (P–1177), Mar. 11, 1991, regarding Japanese published application 02 309280, published Dec. 25, 1990.

Patent Abstracts of Japan, published by Japanese Patent Office, 1996, regarding Japanese published application 08035858, published Feb. 6, 1996.

Patent Abstracts of Japan, published by Japanese Patent Office, 1997, regarding Japanese published application 09042995, published Feb. 14, 1997.

Patent Abstracts of Japan, published by Japanese Patent Office, Sep. 4, 1999, regarding Japanese published application 10288538, published Oct. 27, 1998.

Patent Abstracts of Japan, published by Japanese Patent Office, 1998, regarding Japanese published application 10311741, published Nov. 24, 1998.

* cited by examiner

METHOD AND CIRCUIT FOR CORRECTING PERIODIC SIGNALS OF AN INCREMENTAL POSITION MEASURING SYSTEM

Applicants claim, under 35 U.S.C. § §120 and 365, the benefit of priority of the filing date of Mar. 22, 2000 of a Patent Cooperation Treaty patent application, copy attached, Ser. No. PCT/EP00/02576, filed on the aforementioned date, the entire contents of which are incorporated herein by reference.

Applicants claim, under 35 U.S.C. § 119, the benefit of priority of the filing date of Mar. 30, 1999 of a German patent application, copy attached, Ser. No. 199 14 388.9, filed on the aforementioned date, the entire contents of which are incorporated herein by reference.

BACKGROUND OF THE INVENTION

1. Field of the Invention

The present invention relates to a method, as well as a circuit arrangement for correcting periodic signals from an incremental position measuring system.

2. Description of the Related Art

A circuit arrangement for correcting sinusoidal signals containing position information is known from EP 708 311 A2. In this case, the dc components, the voltage proportions of the sinusoidal signals with respect to each other, and the phase difference are corrected by a process-controlled arrangement. To this end, the points of the sinusoidal signals are selected, in which they intersect and in which they have the maximum amplitude. The dc components in the sinusoidal signals are calculated from these points in the signal progression and are corrected, if required; moreover, the voltage relation of the two sinusoidal signals with respect to each other is calculated and corrected, if required. Finally, the phase difference between the sinusoidal signals is calculated and corrected on the basis of these points. Said calculations and corrections are here performed in a process-controlled manner.

When scanning a measuring graduation, incremental position measuring systems customarily provide a pair of phase-shifted sinusoidal signals at the output. Further processing of these periodic signals takes place in a downstream arranged sequential electronic device, for example a numeric machine tool control device. For further processing of the signals, for example in the course of signal interpolation, the sequential electronic device expects an ideal signal shape of the signals provided by the position measuring system; in particular, constant signal amplitudes, the weakest possible offset signal, as well as an exact 90° phase shift between the periodic signals is assumed. However, as a rule the respective position measuring system does not produce such an ideal signal shape, i.e. because of the most diverse reasons the generated signals usually contain errors with regard to the signal parameters signal amplitude, signal offset and phase position of the signal. A number of solutions have already been proposed on the part of the measuring system for correcting these errors, or for controlling these errors, which will be briefly discussed in what follows.

A circuit arrangement for correcting sinusoidal signals containing position information is known from EP 708 311 A2. In this case the dc components, the voltage proportions of the sinusoidal signals with respect to each other, and the phase difference are corrected by a process-controlled arrangement. To this end the points of the sinusoidal signals are selected, in which they intersect and in which they have the maximum amplitude. The dc components in the sinusoidal signals are calculated from these points in the signal progression and are corrected, if required; moreover, the voltage relation of the two sinusoidal signals with respect to each other is calculated and corrected, if required. Finally, the phase difference between the sinusoidal signals is calculated and corrected on the basis of these points. Said calculations and corrections are here performed in a process-controlled manner.

The disadvantage in this lies in that a relatively complex, and therefore expensive circuit arrangement, in particular a separate processor, is required for performing the three correction steps. Besides the expenses, the not inconsiderable amount of required space is disadvantageous, since the circuit arrangement is advantageously arranged directly on the measuring system.

A method and a device for correcting signals from a coding device are known from DE 196 43 771 A1. Here, sinusoidal signals are simulated, and their amplitude is determined from the difference between the maximum and minimum values. Subsequently, an optimum reference voltage for an analog-to-digital (A/D) converter or an optimum reference voltage and an optimum amplification factor for an amplifier are determined as a function of the amplitude of the simulated signal. Finally, these determined optimum values are set. A processor for determining the optimum reference voltage, and possible an optimum amplification factor, is required for this.

The disadvantage here again lies in the requirement of a processor for determining the optimum values. Furthermore, the optimum values are calculated only for defined positions and are not permanently readjusted, because of which sub-optimal values are unavoidably being set.

A method and a circuit arrangement for detecting amplitude and offset errors in connection with two sinusoidal signals, which are offset by 90°, as well as a regulating device therefor, are known from EP 489 036 A1. Both signals are evaluated in threshold values stages. In this case, the moment of evaluation is defined by the zero crossover of the respectively other signal. The output signals of the threshold value stages are evaluated in a regulating device, and the offset and amplitude are set as a function of the errors detected in the process.

The disadvantage of this arrangement is that only a one-stage control is possible. Therefore either a wide amplitude fluctuation of one of the sinusoidal signals cannot be corrected quickly enough or, with a narrow amplitude fluctuation, overshooting of the control cannot be prevented. Moreover, a regulating device is required which, as a rule, is provided by a processor, which represents a considerable monetary outlay and has a considerable space requirement.

SUMMARY AND OBJECTS OF THE INVENTION

It is therefore an object of the present invention to disclose a method for the correction of periodic signals from an incremental position measuring system. It is intended here that signal parameters of the periodic signals, such as signal amplitude, signal offset and phase position of the signals, can be selectively corrected. There is a particular demand for being able to level small, as well as strong, fluctuations of the respective signal parameters and overshooting of the control.

It is moreover an object of the present invention to disclose a circuit arrangement for correcting periodic signals of an incremental position measuring system, which can be provided as cost-effectively and compactly as possible.

These objects are attained by a method for the correction of periodic signals from an incremental position measuring system that includes determining an actual value of a signal parameter of the periodic signal, comparing the determined actual value of the signal parameter with at least one threshold value, determining a manipulating variable for controlling the signal parameter in a direction toward a predetermined setpoint value, wherein the manipulating variable is selected as a function of a relative position of the determined actual value of the signal parameter with respect to the at least one reference value from at least two preset different manipulating variables and applying the manipulating variable on the signal parameter for adjusting the signal parameter in the direction toward the predetermined setpoint value. These objects are also obtained by a circuit arrangement for the correction of periodic signals from an incremental position measuring system that includes a first assembly comprising a multiplexer having an input to which a periodic signal is supplied and an output out of which an output signal is transmitted, a second assembly that receives the output signal and compares the output signal with at least one preset threshold value and, the second assembly selects a manipulated variable as a function of an actual position of a signal parameter in relation to the at least one preset threshold value from at least two preset, different manipulated variables and an actuating member that performs an action on the signal parameter in order to adjust the signal parameter in a direction toward a preset setpoint value.

The method in accordance with the present invention has the advantage that both minor, as well as strong, fluctuations of signal parameters of the periodic signals from the position measuring system, for example amplitude fluctuations of various strengths, are corrected without overshooting. Minimal fluctuations of the signal parameter signal amplitude can be caused during the normal measuring operation by normal drifting processes, for example, while strong amplitude fluctuations are caused by the soiling of the scanned measuring graduation. In both cases, the method in accordance with the present invention assures the dependable correction of the signals transmitted to the sequential electronic device.

The circuit arrangement in accordance with the present invention has the advantage that it is possible to control slow fluctuations, as well as rapid fluctuations in the signals, for example of the signal parameter signal amplitude, with only one circuit arrangement.

A further advantage lies in the insensitivity of the circuit arrangement in accordance with the present invention in regard to interferences which are superimposed on the signals of the position measuring system. In the case of an amplitude correction this is achieved in that the amplitude of the signals from the position measuring systems is observed over only a very short period of time in order to subsequently correct a possibly existing error. All interferences which are not contained in this time interval cannot affect the correction, or control.

Within the scope of the present invention it is basically possible, depending on the type of application, to correct only a portion of the above discussed signal errors, or to readjust the respective signal parameters; for example, it is possible in the manner of the present invention to perform the correction, or control, of the signal amplitude and the signal offset, while a correction of possible phase position errors is omitted, etc. The present invention can thus be flexible adapted to the respective requirements regarding signal quality.

It should furthermore be mentioned, that the circuit arrangement in accordance with the present invention requires only a small circuitry outlay, but that at the same time a rapid and dependable signal correction is assured. The circuit arrangement in accordance with the present invention does not require the detection of peak signal values in particular, which makes great demands on circuit technology.

Further advantages, as well as details of the method in accordance with the present invention and the circuit arrangement in accordance with the present invention ensue from the following description of exemplary embodiments while making reference to the drawings.

DESCRIPTION OF THE PREFERRED EMBODIMENT(S) OF THE INVENTION

Figure 1:
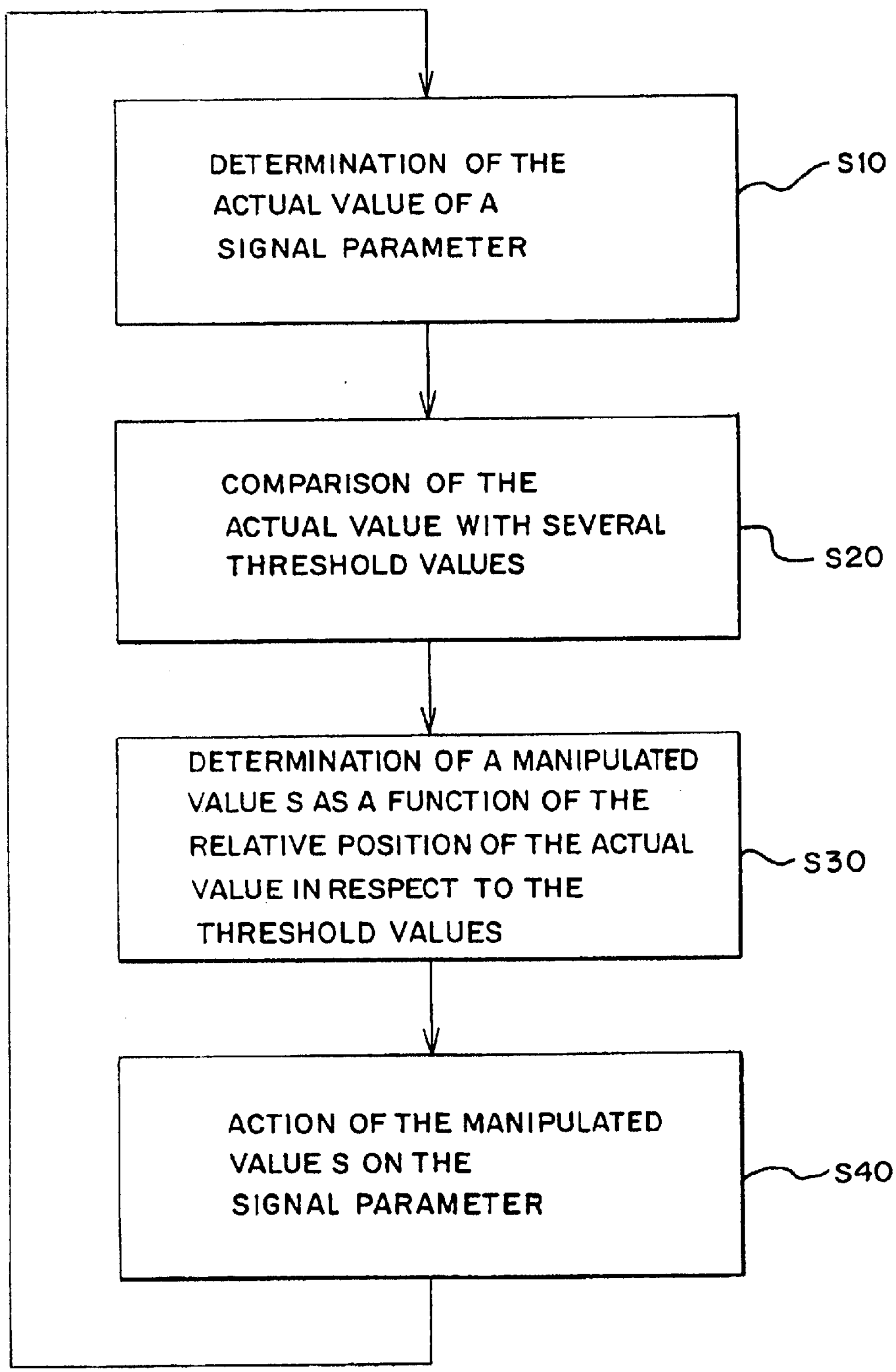
FIG. 1 schematically shows a flow diagram to basically explain an embodiment of a method in accordance with the present invention.

The basics of the method in accordance with the present invention will be explained in what follows with the aid of the flow diagram in FIG. 1. The basis of the described method is considered to be an incremental position measuring system, including a periodic measuring graduation and a scanning unit which is movable with respect to it. The result of a relative movement between the measuring graduation and the scanning unit are periodic signals which are modulated as a function of the displacement and are transmitted to a downstream connected sequential electronic device. Here, the relative movement can be provided in the form of a linear movement, as well as in the form of a rotational movement.

The signals generated are customarily a pair of sinusoidal analog signals with a phase shift of 90° with respect to each other. Such a position measuring system can be employed, for example, for the precise determination of the relative position of a tool and a workpiece in a numericallycontrolled machine tool; in this case the numerical machine tool control device acts as the sequential electronic device. Such position measuring systems can basically be based on the most diverse physical scanning principles, for example on a photoelectric, magnetic, inductive or capacitive principle. The present invention can of course be employed in connection with all these scanning principles.

It is now assured by the method of the present invention, which is explained in what follows, that sufficiently optimized signals are always transmitted to the sequential electronic device for further processing, wherein the respective optimization takes specifically place with respect to defined signal parameters. The signal amplitude, the signal offset, as well as the above mentioned relative phase position are cited in particular as signal parameters which are critical, or which should be optimized.

In a first step S10 of the method of the present invention, the present actual value of at least one of the various signal parameters is determined, preferably within one signal period. In the subsequent step S20, a comparison of the detected actual value with one or several predetermined threshold values takes place. To this end, a valuation of the respective actual value with regard to the relative position to the one, or the various threshold values takes place in this step S20. It is therefore evaluated whether the respective actual value of the signal parameter is greater or less than the defined threshold value. Therefore, no peak value detection, which is elaborate in regard to circuit technology is required at this point. Depending on the relative position of the actual value, a manipulated variable is determined in the subsequent step S30, which acts in step S40 on the periodic signals in order to regulate them in the direction of a predetermined setpoint value. Thereafter, the actual value of the signal parameter is again determined in accordance with method step S10 in a subsequent signal period in order to further act on the respective signal parameter, if necessary, until it shows the desired setpoint value, or at least lies within a defined setpoint range, etc.

At least two predetermined different manipulated variables SN (for example N=1 . . . 4) are available for the manipulated variable S determined in method step S30. The different manipulated variables SN are each definitely assigned to a defined relative position of the actual value in relation to the predetermined threshold values, and are predetermined with respect to their respective signs, as well as their amounts. The at least two manipulated variables S differ in regard to the amounts and/or their signs. Four manipulated variables are advantageously available, two of which clearly differ from each other as to their amounts; each one of the manipulated variables of different amounts furthermore has a corresponding manipulating variable with reversed signs. It is assured in this way that it is possible to appropriately react at the regulating end to fluctuations of different strengths of the respective signal parameter. If, for example, it is intended in this way to correct the signal parameters signal amplitude and signal offset, various causes can lead to an undesired change of these signal parameters. For example, slow drifting of the signal amplitude can be present, as well as a clear signal amplitude dip in case of the measuring graduation being soiled or dirty. While in the first case a smaller manipulated variable S is determined for the regulating step S40 by the method of the present invention, the larger manipulated variable is selected in the second case, etc.

It has furthermore been shown to be advantageous in connection with the method of the present invention if the determination of the actual value of the respective signal parameter in method step S10 takes place within a narrow time window, preferably within one signal period. By this it is possible to avoid interferences to a large extent, which might possible affect the control.

In the same way a reaction in accordance with regulating technology with the aid of the defined manipulated variable S takes place in step S40 within only a narrow time window, for example over a limited number of signal periods.

It is moreover advantageous if a possibly required change of the actual manipulated variable S is performed only at those points in time, at which a zero crossover of the periodic signal occurs, i.e. when the amplitude of the periodic signal is zero, or at least almost zero.

Regarding definite embodiments and further advantageous details of the method in accordance with the present invention, as well as circuit arrangements, in accordance with the present invention, reference is made to the following description of several exemplary embodiments in the further drawing figures.

Only the signal parameters signal amplitude and signal offset are corrected in the signals from an incremental position measuring system in the following first exemplary embodiment of a circuit arrangement in accordance with the present invention. In this case the first exemplary embodiment of a circuit arrangement in accordance with the present invention is suitable for executing the above explained method. Regarding the correction of the signal parameter phase position of the signal, reference is made to the description of a second exemplary embodiment to follow later.

In the first variation of a circuit arrangement it is assumed that the position measuring system issues a sinusoidal signal and a sinusoidal signal offset by 90°, i.e. a cosinusoidal signal, as the output signals. The output signals sin, cos from the position measuring system are respectively transmitted over two lines as difference signals. From these it is possible to generate the respectively inverted signals −sin, −cos in a simple way, provided they are not present anyway.

Figure 2A:
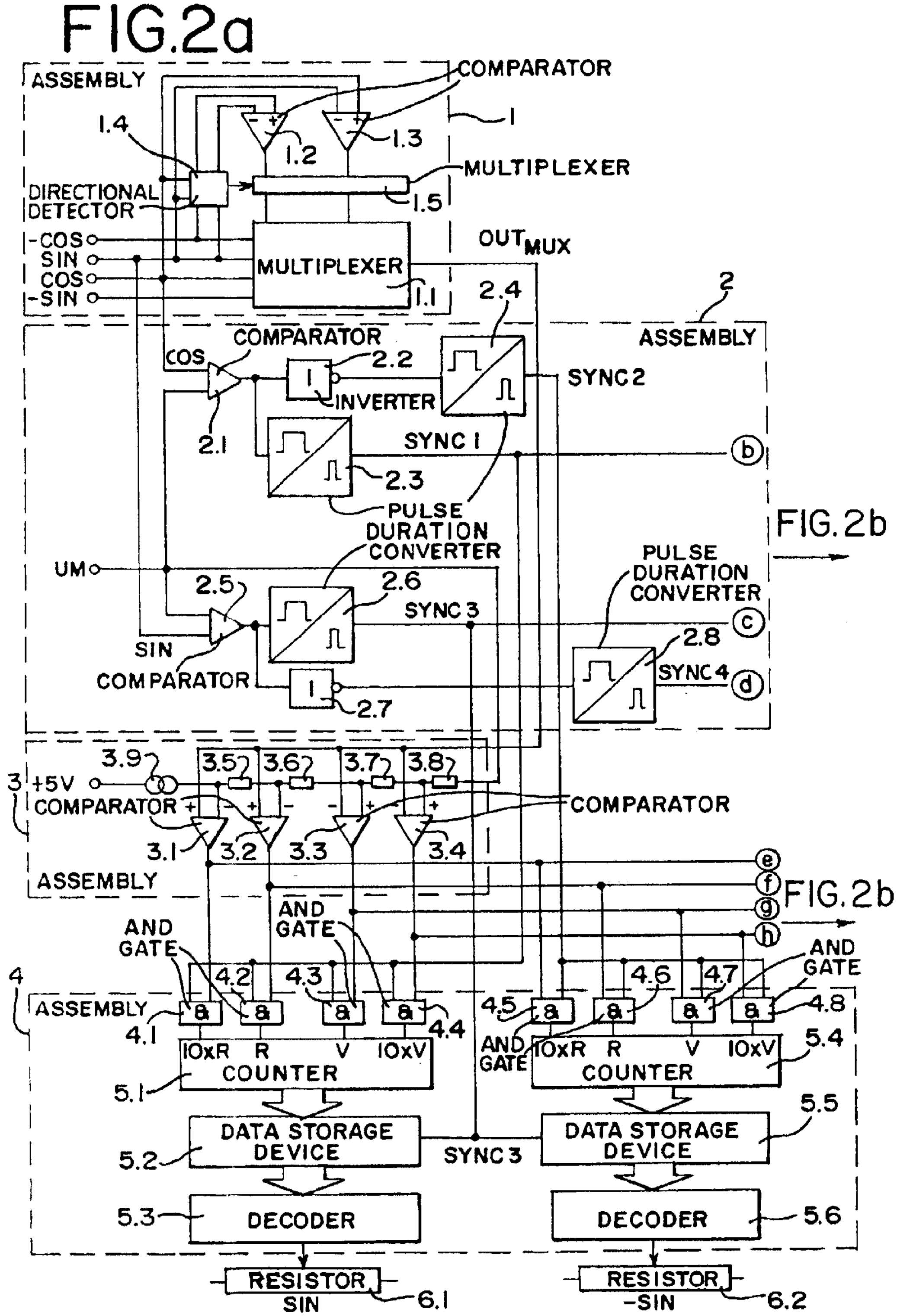
FIG. 2*a* schematically shows a first exemplary embodiment of a circuit arrangement in accordance with the present invention, suitable for amplitude and offset correction of a first periodic signal, transmitted as a differential signal, from an incremental position measuring system.

FIG. 2*a* shows a first exemplary embodiment of the circuit arrangement, to which a sinusoidal signal sin, a cosinusoidal signal cos, as well as an inverted sinusoidal signal −sin and an inverted cosinusoidal signal −cos are conducted, which are generated in a known manner by the incremental measuring system. The signals sin, cos, −sin, −cos are conducted to the inputs of a multiplexer 1.1 in a first assembly 1. The control of the multiplexer 1.1 takes place as a function of the direction of movement of the measuring system by the evaluation of the input signals sin, cos, −sin, −cos by comparators 1.2 and 1.3. In particular, the sinusoidal signal sin is supplied to the inverting input, and the inverted cosinusoidal signal −cos to the non-inverting input of a first comparator 1.2. The sinusoidal signal sin is also conducted to the inverting input of a second comparator 1.3 in the first assembly 1, and the cosinusoidal signal cos to its non-inverting input. The output signals of the two comparators 1.2, 1.3 are used for controlling the multiplexer 1.1 in such a way that the output signal of the first comparator 1.2 is used in the multiplexer 1.1 as the low-order address bit for selecting one of the input signals, and the output signal of the second comparator 1.3 as the high-order address bit for selecting one of the input signals. If the inverted cosinusoidal signal −cos is conducted to the input of the multiplexer 1.1 with the address 0, the sinusoidal signal sin to the input with the address; 1, the cosinusoidal signal cos to the input with the address 2, and the inverted sinusoidal signal −sin to the input with the address 3, that respective input signal is issued by the multiplexer 1.1 as the output signal OUTMUX, which momentarily has the maximum amplitude. This applies to the first movement direction on the part of the position measuring system.

If the movement direction on the part of the position measuring system changes, this is detected in a directional detector 1.4 which, for example, evaluates in a known manner the sinusoidal and cosinusoidal output signal of the position measuring system. In this case the directional detector 1.4 controls a further multiplexer 1.5, which connects the output signals of the comparators 1.2 and 1.3 with the control inputs of the multiplexer 1.1 in such a way that even with a changed movement direction that input signal sin, cos, –sin, –cos is passed on by the multiplexer 1.1 as the output signal OUTMUX, which momentarily has the maximum amplitude. It is thus assured by the directional detector 1.4 and the multiplexer 1.5 that, independently of the movement direction on the part of the position measuring system, always that half-wave of the input signal sin, cos, –sin, –cos is passed on as the output signal OUTMUX, which momentarily has the maximum amplitude.

Figure 4A:
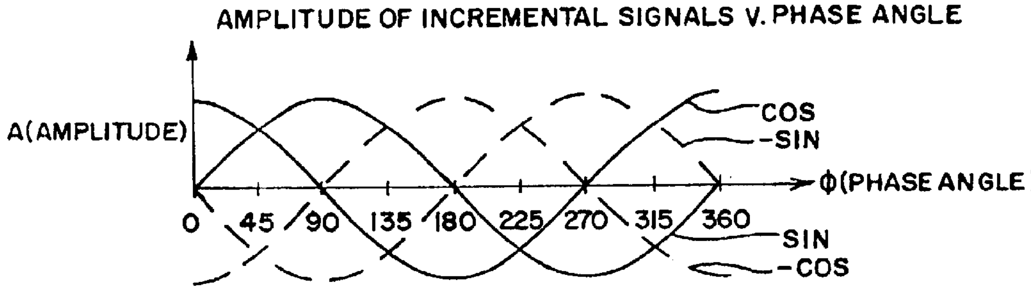
FIGS. 4*a* to 4*f* show various signals from the first exemplary embodiment of the circuit arrangement of FIGS. 2*a*–b and 3 in accordance with the present invention.
Figure 4B:
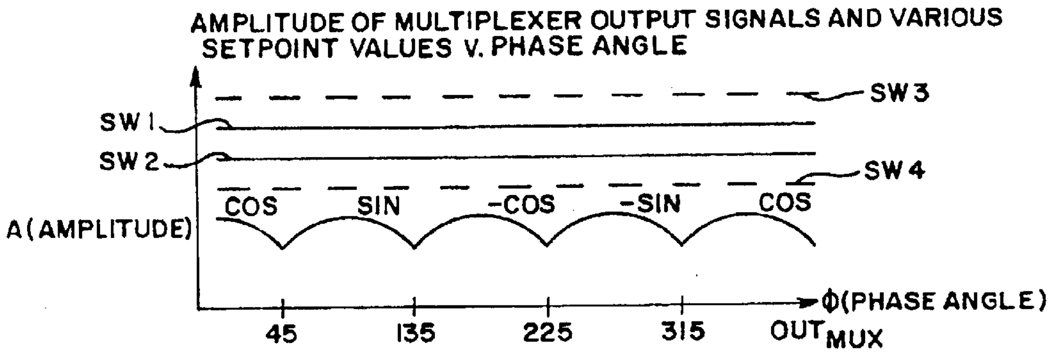
Figure 4C:
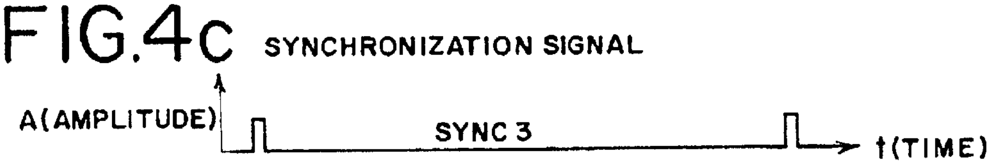

The connection between the four input signals sin, cos, –sin, –cos and the output signals OUTMUX generated by the multiplexer 1.5 is graphically represented in FIGS. 4*a* and 4*b*.

It would alternatively also be possible to arrange the multiplexer 1.5 upstream of the multiplexer 1.1, so that the output signals sin, cos, –sin, –cos from the position measuring system are conducted to the inputs of the multiplexer 1.1 in such a way that the multiplexer 1.1 issues the respective input signal, regardless of the movement direction, as the output signal MAXMUX, which momentarily has a maximum amplitude.

In a further alternative embodiment, the multiplexer 1.5 can, depending on the movement direction, also reverse the sign of the sinusoidal and cosinusoidal signals passed on to the synchronization assembly 2. By this, in a first movement direction the cosinusoidal signal cos is passed to the comparator 2.1 and the sinusoidal signal sin to the comparator 2.5. In a second movement direction and switched over by the multiplexer 1.5, the sinusoidal signal –sin is passed to the comparator 2.5 and the cosinusoidal signal –cos to the comparator 2.1.

The output signal MAXMUX from the multiplexer 1.1, or the first assembly 1, generated in this way is conducted to a processing assembly that includes assemblies 3, 4 and 4' which will be discussed below. In particular, the output signal MAXMUX is conducted to four comparators 3.1, 3.2, 3.3 and 3.4, which are arranged in a second assembly 3. The output signal MAXMUX from the multiplexer 1.1 is conducted to the respectively non-inverting input of a first and a second comparator 3.1 and 3.2; the output signal MAXMUX from the multiplexer 1.1 is conducted to the respectively inverting input of a third and fourth comparator 3.3 and 3.4. The second inputs of the comparators 3.1 to 3.4 are each connected with a pickup of a voltage divider, which is also a part of the second assembly 3.

The voltage divider, including a current source 3.9 and four resistors 3.5 to 3.8, is designed in such a way that respectively one pickup is provided upstream of the resistor 3.5, between the resistors 3.5 and 3.6, 3.6 and 3.7, and between the resistors 3.7 and 3.8. The resistors 3.5 to 3.8 have been selected such, that the voltage at each pickup can be used as the threshold voltage for the control, which will be explained in detail in what follows; the threshold values SW1 to SW4 are preset in this way. For this purpose, the inverting input of the first comparator 3.1 is connected with the first pickup upstream of the resistor 3.5. The inverting input of the second comparator 3.2 is connected with the pickup between the resistors 3.5 and 3.6; the non-inverting input of the third comparator 3.3 is connected with the pickup between the resistors 3.6 and 3.7, and the non-inverting input of the fourth comparator 3.4 is connected with the pickup between the resistors 3.7 and 3.8.

Alternatively to the represented exemplary embodiments of a voltage divider with fixedly set resistors, or threshold values, it can also be provided to design the various threshold values adjustably. This can be achieved for example by an appropriate arrangement with several switchable resistors. The present invention can be advantageously adapted to various scanning methods in this way. It is possible by the respective threshold values, together with the step increments of the actuating member, to set the desired control slope and the control speed; in this way it is possible to affect which signal changes can be leveled out from signal period to signal period.

In a third assembly 4 the output signals of the four comparators 3.1 to 3.4 are subsequently conducted to first inputs of two groups of respectively four AND gates 4.1 to 4.4 and 4.5 to 4.8. A first synchronization signal SYNC1 is conducted to the second inputs of the first group of AND gates 4.1 to 4.4. The AND gates 4.1 to 4.4 of the first group are released by the synchronization signal SYNC1 when the cosinusoidal input signal cos has a minimum amplitude near zero. The release lasts as long as the first forward-reverse counter 5.1 connected with the AND gates 4.1 to 4.4 needs for taking over the output signals of the AND gates 4.1 to 4.4.

The output signal from the first comparator 3.1 is conducted, synchronized by the first AND gate 4.1, to a first counter input 10*x*R of a counter 5.1, which controls the counter 5.1 in such a way that it counts backward in a first increment. The same as the further counters 5.4, 5.7, 5.10, the counter 5.1 is embodied in a known manner as a forward-reverse counter; the various counter inputs act as control inputs, i.e. depending on the acted-upon counter input, counting is performed at defined step increments in a defined direction. The first increment of the counter 5.1 is selected in such a way that it is possible to compensate even strong amplitude fluctuations as rapidly as possible by a suitable control device.

The output signal from the second comparator 3.2 is conducted, synchronized by the second AND gate 4.2, to a second counter input R of the counter 5.1, so that the counter 5.1 is controlled in such a way that it counts backward in a second, smaller step increment. The second, smaller step increment of the counter 5.1 is selected in such a way that slow signal drifts during the normal operation of the measuring system are compensated without overshooting by a suitable control.

The output signal from the third comparator 3.3 is conducted, synchronized by the third AND gate 4.3, to a third counter input V of the counter 5.1, which counts forward in a second step increment. Finally, the output signal from the fourth comparator 3.4 is conducted, synchronized by the fourth AND gate 4.4, to a fourth counter input 10*x*V of the counter 5.1, which controls the counter 5.1 in such a way that it counts forward in a first step increment.

Thus, the various AND gates 4.1 to 4.4 of the third assembly 4 are used for the selective supply of signals to defined counter inputs R, V, 10*x*R, 10*x*V of the counter 5.1.

Conducting the signals to the various counter inputs R, V, 10xR, 10xV takes place here as a function of previously performed comparison operations, i.e. the various counter inputs R, V, 10xR, 10xV are acted upon as a function of the output signals of the comparators 3.1 to 3.4 in accordance with the actual value of the signal parameter compared with the preset threshold values SW1 to SW4. The respective counter step increment, and therefore the actual manipulated variable for the control of the signal parameter, is set in this way.

The respective actual counting result of the counter 5.1 is passed on to an interim data storage device 5.2. A third synchronization signal SYNC3 is furthermore conducted to the interim data storage device 5.2. The counting result, or the counter setting, is supplied from the interim data storage device 5.2 to a downstream arranged decoder 5.3 at times which are determined by the third synchronization signal SYNC3. An actuating member of a control device in the form of an adjustable resistor 6.1 is set with the aid of the decoder 5.3. In the end, the signal amplitude, and possibly the signal offset, of the signal sin put out by the position measuring system is changed by control technology via the defined adjustment of the resistor 6.1. Reference is made to the description of FIG. 3, which is still to follow, regarding the arrangement of the resistor 6.1 in the signal path of the position measuring system.

The second group of AND gates 4.5 to 4.8 in the third assembly 4 is connected with a second counter 5.4. The output signals of the comparators 3.1 to 3.4 from the second assembly 3 respectively also constitute an input signal for the AND gates 4.5 to 4.8. The second input signal from the AND gates 4.5 to 4.8 is provided by a second synchronization signal SYNC2. The second synchronization signal SYNC2 always releases the AND gates 4.5 to 4.8 for passing on the output signals from the comparators 3.1 to 3.4 at the time when the cosinusoidal input signal cos to the multiplexer 1.1 has an amplitude near zero. Again, the length of the release is selected to be such that the second counter 5.4 can take over the output signals from the AND gates 4.5 to 4.8. In the process, the output signals from the first AND gate 4.5 is conducted to a counter input 10xR of the second counter 5.4, which controls reverse counting in a first step increment. The output signal from the second AND gate 4.6 is conducted to a second counter input R of the counter 5.4, which controls reverse counting in a second, smaller step increment. The output signal from the third comparator 3.3 is conducted to a third counter input V of the counter 5.4, which controls forward counting in a second, smaller step increment. Finally, the output signal from the fourth AND gate 4.8 of the second group is conducted to the fourth counter input 10xV of the counter 5.4, so that the latter is controlled in such a way that it counts forward in a first, larger step increment.

The output signal from the second counter 5.4 in the third assembly 5 is conducted to a second interim data storage device 5.5. The second interim data storage device 5.5 is provided with the third synchronization signal SYNC3, the same as the first interim data storage 5.2. Because of this, the second interim data storage 5.5 device issues the result of the count from the second counter 5.4 at the same time to a second decoder 5.6 as the first interim data storage device 5.2. A second actuating member, again designed as an adjustable resistor 6.2, is set as a function of the actual count. The same as the first adjustable resistor 6.1, the second actuating member is used to adjust the signal parameter signal amplitude, and possibly signal offset, of one of the output signals from the position measuring system; in the present example the signal −sin, which is transmitted to the sequential electronic device, is appropriately controlled. In this connection, too, reference is made to the description of FIG. 3 to follow which, inter alia, shows the arrangement of the various actuating members, or adjustable resistors 6.1, 6.2, in the signal path.

Figure 3:
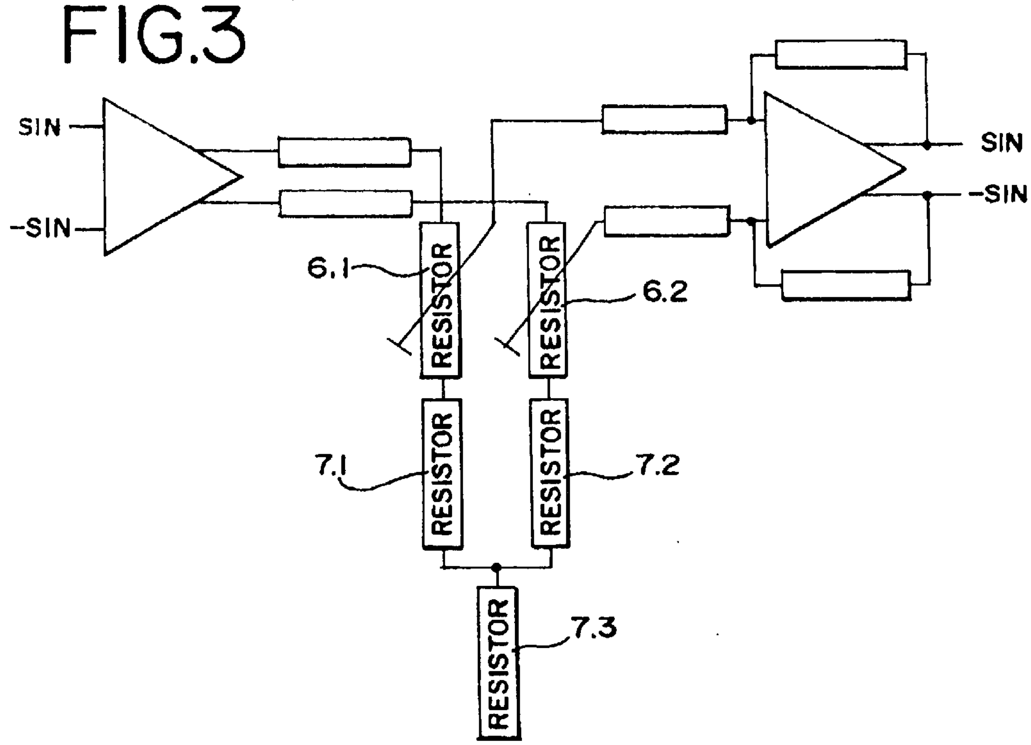
FIG. 3 is a schematized circuit diagram of a first possible arrangement of actuating members operated in accordance with the present invention in the signal path of an incremental position measuring system.

Since the output signals of the position measuring system are transmitted over two lines in the form of differential signals for improving the interference resistance, as represented in FIG. 3, the signal amplitudes and the signal offset of the periodic signals sin, −sin from the position measuring system, which are transmitted to the downstream-connected sequential electronic device, are set in both lines by the resistors 6.1 and 6.2, or by the appropriate actuating members. Besides the resistors 6.1, 6.2 shown, other structural elements, for example adjustable amplifiers, MOS transistors, bipolar transistors, etc., are of course also suitable as actuating members.

The generation of the various synchronization signals SYNC1, SYNC2, SYNC3, SYNC4 in a fourth assembly 3, and their function in the present example of a circuit arrangement in accordance with the present invention, will be addressed in detail in what follows. Moreover, reference is made to the representation in FIGS. 4*a* to 4*f* regarding the various synchronization signals SYNC1 to SYNC4 and the connection with the various other signals.

Inter alia, in the present exemplary embodiment it is basically always assured by the synchronization signals SYNC1 to SYNC4 that the output signals from the comparators 3.1 to 3.4 are switched to the respective counter 5.1, 5.4 in accordance with the input signals sin, cos, −sin, −cos. Here, the various AND gates have a sorting function, so that information regarding the same input signals is always provided to each counter 5.1, 5.4.

The input signals sin, cos, −sin, −cos are combined into an envelope curve by the multiplexer 1.1, so that always all input signals sin, cos, −sin, −cos are evaluated by the same comparators. Errors of different comparators therefore do not have an effect in the form, of a signal difference at the output of the control device. In the end, the various AND gates distribute the output signals from the comparators back to the counters assigned to the input signals sin, cos, −sin, −cos.

Figure 4D:
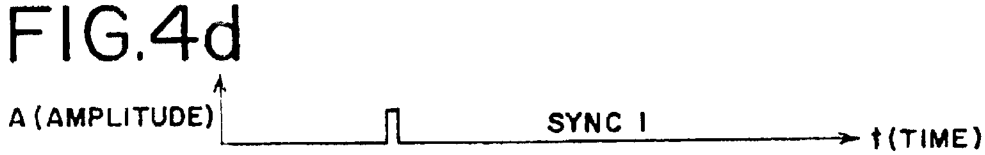
Figure 4E:

To generate the first synchronization signal SYNC I, represented in FIG. 4*d*, for the first group of AND gates 4.1 to 4.4, the cosinusoidal input signal cos from the multiplexer 1.1 is compared with its dc component UM in a comparator 2.1 of the fourth assembly 2. Initially, the output signal of the comparator 2.1 has a pulse duty factor of 1:1, and is subsequently conducted in the fourth assembly 2 to a pulse duration converter 2.3. The latter changes the pulse duty factor in such a way, that at the time at which the cosinusoidal input signal cos has a value corresponding to the mid-voltage UM, a HIGH level is issued by the pulse duration converter 2.3 as the synchronization signal SYNC1. The length of the HIGH pulse initially generated by the comparator 2.1 is reduced by this. The HIGH pulse generated in this way is then used for the synchronization of the output signals of the comparators 3.1 to 3.4 by the first group of AND gates 4.1 to 4.4.

Figure 4F:
Figure 5:
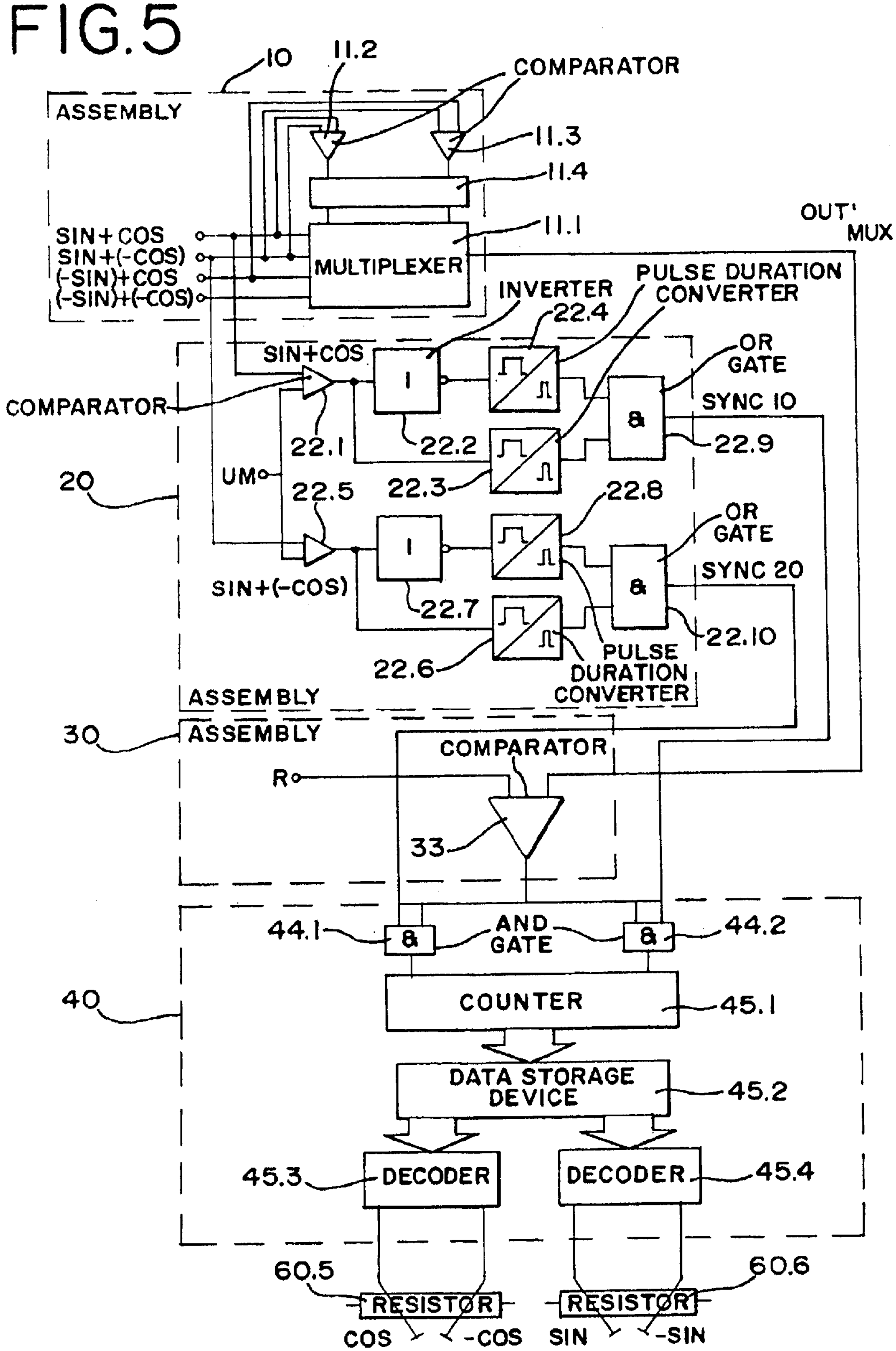
FIG. 5 schematically shows a second exemplary embodiment of a circuit arrangement in accordance with the present invention, suitable for correcting the phase position of several periodic signals from an incremental position measuring system.

To generate the second synchronization signal SYNC2 represented in FIG. 4*f*, in the fourth assembly 2, the output signal from the comparator 2.1 is additionally conducted to an inverter 2.2. Subsequently the pulse duty factor is again changed in a pulse duration converter 2.4 in such a way, that at the time at which the cosinusoidal input signal cos has a value corresponding to the mid-voltage UM, a HIGH level is issued by the pulse duration converter 2.4. By this the duration of the HIGH level of the output signal from the inverter 2.2 is reduced. The output signal from the pulse duration converter 2.4 is conducted as the second synchronization signal SYNC2 to the second group of AND gates 4.5 to 4.8.

To generate the third synchronization signal SYNC3, the sinusoidal input signal sin is compared in a further comparator 2.5 of the fourth assembly 2 with the mid-component UM, which is identical for all input signals, so that the output signal from the comparator 2.5 again has a pulse duty factor of 1:1. This output signal is conducted to a pulse duration converter 2.6, which changes the pulse duty factor and then issues a HIGH level when the cosinusoidal input signal from the multiplexer 1.1 has a maximum amplitude. This third synchronization signal SYNC3 is conducted to the interim data storage devices 5.2 and 5.5 for synchronization.

The third synchronization signal SYNC3, which was obtained from the sinusoidal input signal sin, is therefore used for synchronizing the setting of the adjustable resistors 6.1 and 6.2, or actuating members, through which the signals sin, −sin from the incremental position measuring system are conducted. In this way the adjustment of the resistors 6.1 and 6.2 takes respectively place at those times, at which the change of the resistance value does not lead to a jump in the passed-on signal sin, −sin of the incremental position measuring system.

By the synchronization of the AND gates 4.1 to 4.8 by synchronization signals SYNC1 and SYNC2 obtained from the cosinusoidal input signal cos it is assured, as already indicated above, that the output signals from the comparators 3.1 to 3.4 assigned to the input signal sin are conducted to the counter 5.1, and the output signals from the comparators 3.1 to 3.4 assigned to the input signal −sin are conducted to the counter 5.4.

The various synchronization signals SYNC1, SYNC2, SYNC3, SYNC4, which are put out by the pulse duration converters 2.3, 2.4, 2.6 and 2.8 of the fourth assembly 2, only have a HIGH level for the absolutely required length of time for transferring the control signals into the forward-reverse counters 5.1 and 5.4. It is assured by this as short as possible transfer time, that interferences with the output signal from the multiplexer 1.1, which occur outside of this time window for the transfer, do not lead to errors in the control. But if nevertheless an interference should be superimposed on the output signal from the multiplexer 1.1 at exactly this time, the effect of the interference on the control is kept negligible because of the limited step incrementing of the counters 5.1 and 5.4.

Figure 2B:
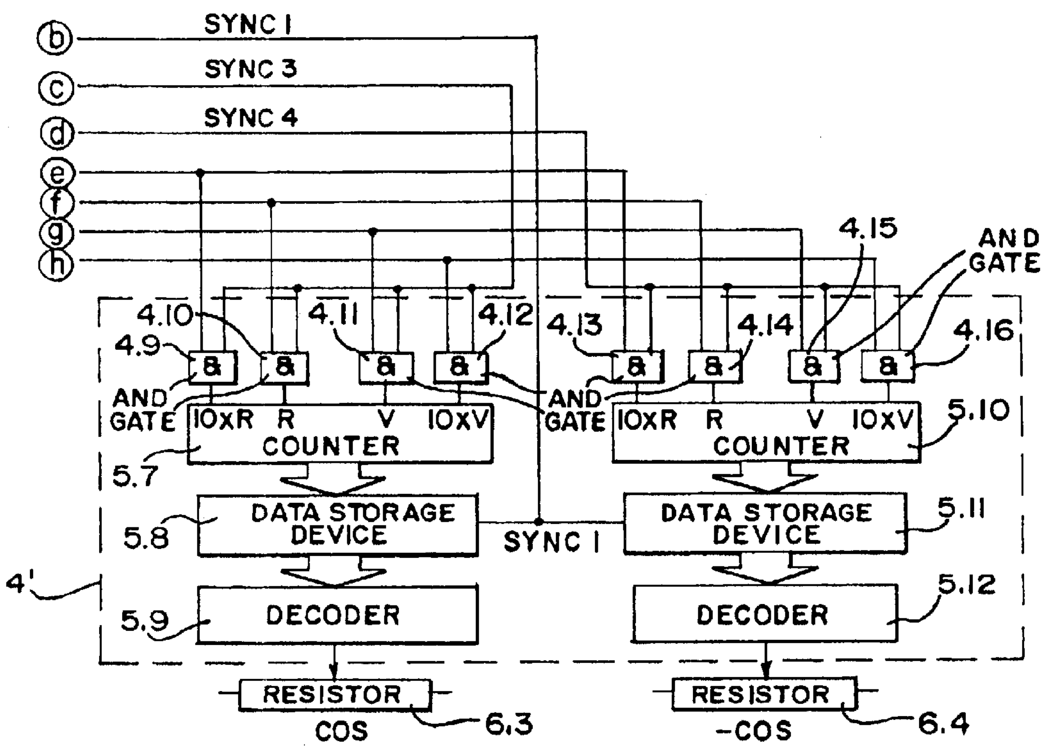
FIG. 2*b* schematically shows a supplement to the first exemplary embodiment of a circuit arrangement in accordance with FIG. 1*a* for a second phase-shifted output signal.

To set the signal parameters signal amplitude and signal offset of the cosinusoidal output signals cos, −cos from the incremental position measuring system, the assemblies 4', 6.3. 6.3, represented in FIG. 2*b*, are additionally needed. As represented, assemblies from FIG. 1*a* are also used, i.e. the signals generated by them are also supplied to the assembly 4' via the respective signal lines a to h. The assemblies from FIG. 2*a* also used in this way are in particular the first assembly 1, the second assembly 3, as well as the fourth assembly 2. The third assembly 4' represented in FIG. 1*b*, as well as the actuating members 6.3, 6.4, correspond to a large extent to the elements represented in FIG. 1*a*, both in their wiring and in their function. In this way a suitable manipulated variable is also in the end defined by the third assembly 4' in order to adjust the signal parameters signal amplitude and signal offset of the signals cos, −cos from the position measuring system to the predetermined setpoint values by means of the actuating members 6.3, 6.4.

In turn, the signal amplitude and, if required, the signal offset of the cosinusoidal output signals cos, −cos from the incremental measuring system are adjusted by the actuating members, also embodied as adjustable resistors 6.3 and 6.4.

The synchronization signal SYNC1 for the two interim data storage devices 5.8 and 5.1 which is output by the pulse duration converter 2.3 on the signal line b is used to achieve an adjustment of the resistors 6.3 and 6.4 at the zero crossover of the output signals cos, −cos from the position measuring system and in this way to prevent signal jumps.

To synchronize the control of the two counters 5.7 and 5.10, the two groups of AND gates 4.9 to 4.12 and 4.13 to 4.16 are connected with the pulse duration converters 2.6 and 2.8, or with the synchronization signals SYNC3, SYNC4 on the signal lines c, d. Their control pulses, or synchronization signals SYNC3, SYNC4, are derived from the sinusoidal output signal sin from the measuring system. By this, analogous to FIG. 2*a*, the output signals from the comparators 3.1 to 3.4 assigned to the input signal cos are conducted to the counter 5.7, and the output signals from the comparators 3.1 to 3.4 assigned to the input signal −cos are conducted to the counter 5.10.

The assemblies 5.9 and 5.12 are again designed as decoders in order to set the actuating members, or resistors 6.3 and 6.4, proportionally to the delivered counted value.

The functioning of the first exemplary embodiment in accordance with the present invention, represented in FIGS. 2*a* and 2*b*, which is also suitable for executing the method in accordance with the present invention, will be explained in detail in what follows.

As a rule, a periodic analog sinusoidal signal sin and a periodic analog cosinusoidal signal cos are put out by an incremental position measuring system. By the sequential electronic device it is easily possible to generate signals −sin, −cos, which are inverse to these two output signals sin, cos from the incremental measuring system, provided they-are not also put out by the position measuring system anyway, as is the case in the present example. In the first assembly 1, the four signals sin, cos, −sin, −cos are conducted to the multiplexer 1.1. Two control signals for the multiplexer 1.1 are generated by the comparators 1.2 and 1.3 in such a way that the multiplexer 1.1 always outputs the input signal as the output signal OUTMUX, which momentarily has a maximum amplitude. By this, the envelope curve of the positive half-waves of the four input signals sin, cos, −sin, −cos is put out via the multiplexer 1.1. This envelope curve, or the output signal OUTMUX from the multiplexer 1.1, is representative of possible amplitude and offset deviations of the output signals from the position measuring system, which are intended to be corrected in this exemplary embodiment.

The actual value of those signal parameters, which in the end are intended to be adjusted to the preset setpoint values, is therefore determined, inter alia, in the circuit arrangement in accordance with the present invention with the aid of the first assembly 1. Accordingly, in the present example these are the actual values of the signal parameters signal amplitude and signal offset, which can be determined easily in the proposed way by a circuit.

The envelope curve, or the output signal OUTMUX of the multiplexer 1.1 created in this way, is subsequently conducted to first inputs of four comparators 3.1 to 3.4, which are arranged in a second assembly 3 in the circuit arrangement in accordance with the present invention. The second inputs of these four comparators 3.1 to 3.4 are connected with pickups of voltage dividers 3.5 to 3.9. It is determined by comparing the amplitudes of the envelope curves with the voltages picked up at the voltage dividers 3.5 to 3.9 whether the maximum amplitudes of the output signals sin, cos, –sin, –cos from the position measuring system lie within a desired range, or considerably above or below this range. It is therefore possible to determine whether only a slight adjustment, a considerable adjustment, or possibly no adjustment at all of the signal amplitudes, or the signal offset, is required. The threshold values SW1 to SW4, and therefore the range, in which only a slight adjustment is required, or the range, in which a considerable adjustment is required, etc., can be definitely set by the selection of the resistors 3.5 to 3.8 of the voltage divider.

The second assembly 3 of the circuit arrangement in accordance with the present invention is therefore used for comparing the actual value of a signal parameter determined in the first assembly 1 with several predetermined threshold values SW1 to SW4. Here, the threshold values SW1 to SW4 can be definitely set by the appropriate dimensioning of electronic structural elements, in the above example the voltage divider was used for this. Thus, the various threshold values SW1 to SW4 are transformed into corresponding comparison voltages; the four set threshold values are represented in FIG. 4*b*, together with the generated envelope curve, or the output signal OUTMUX, of the multiplexer 1.1.

A synchronization is required to evaluate the respective maxima of the envelope curve with respect to the various threshold values SW1 to SW4. As explained above, the appropriate synchronization signals SYNC1 to SYNC4 are generated by the fourth assembly 2. The required synchronization is performed for example for the signals sin, –sin by the AND gates 4.1 to 4.4 and 4.5 to 4.8. By the first and second synchronization signals SYNC1, SYNC2, the two groups of AND gates 4.1 to 4.4 and 4.5 to 4.8 are respectively released to pass on the output signals from the comparators 3.1 to 3.4 when the relative maxima of the input signals sin, –sin are applied. The output signals of the AND gates 4.1 to 4.8 are used as control signals for the various counter inputs of the counters 5.1 and 5.4.

In case the amplitude of the envelope curve corresponding to the signal sin is greater than the maximum threshold value SW3 set by the voltage divider, a control signal is put out by the first comparator 3.1, which is synchronized by the first AND gate 4.1 and the synchronization signal SYNC1 and conducted to the first counter input 10*x*R of the first counter 5.1. The presence of an input signal at the first counter input 10*x*R of the counter 5.1 causes the latter to count in reverse with a first step increment. This first counter input 10*x*R of the counter 5.1 here has priority over its second counter input R, which is supplied with the output signal from the second comparator 3.2 via the second AND gate 4.2.

If the amplitude of the envelope curve, or of the output signal OUTMUX, from the multiplexer 1.1 lies, for example, in a range above the threshold value SW1, in which merely a negligible adjustment of the signal amplitude is required, no HIGH level is put out by the first comparator 3.1; only the second comparator 3.2 puts out a control signal to the AND gate 4.2, and therefore to the second counter input R of the first counter 5.1. The counter 5.1 recognizes from this that reverse counting with a second, smaller step increment is to be performed. In the two cases illustrated, the two comparators 3.3 and 3.4 do not put out any output signals.

If the envelope curve is located in the range between the threshold values SW1 and SW2, none of the four comparators 3.1 to 3.4 puts out a signal, so that the counter settings of the counter 5.1 to 5.4 are not changed, i.e. in this case a control with the step increment zero is performed. Therefore the signal parameters signal amplitude and signal offset lie within the desired setpoint value range, or setpoint value interval, so that no adjustment is required in the end.

If the amplitude of the envelope curve, or of the output signal OUTMUX, of the multiplexer 1.1 falls into a range which lies slightly below the threshold value SW2, the third comparator 3.3 puts out a HIGH level. From this, the counter 5.1 recognizes that it is intended to count forward with a second step increment. If the amplitude of the envelope curve continues to drop, the fourth comparator 3.4 also puts out a control signal via the fourth AND gate 4.4 to the fourth counter input 10*x*V of the counter 5.1, from which it recognizes that it is intended to count forward with a first step increment.

Based on the output signals from the comparators 3.1 to 3.4, the counter inputs of the remaining counters 5.4, 5.7 and 5.10 are analogously charged with the appropriate signals, and step increments and counting directions for the various counters 5.4, 5.7 and 5.10, which have been determined in this way, are preset.

The count of the various counters. 5.1, 5.4, 5.7, 5.10 is respectively transferred into an associated, or downstream connected, interim data storage device 5.2, 5.5, 5.8, 5.11. The interim data storage devices 5.2, 5.5, 5.8, 5.11 put out the result of the count at synchronized times to downstream connected decoders 5.3.5.6, 5.9, 5.12, which in turn actuate an associated adjustable resistor 6.1, 6.2, 6.3, 6.4 as the actuating devices in the control device. By adjusting this resistor in accordance with the counter value, a resistor 6.1, 6.2, 6.3, 6.4, which is proportional to the counter value, is set, by which the signal amplitude and the signal offset of the signal from the position measuring system are affected, which are further processed for the position determination.

Thus, the determination of the respectively required manipulated variable for adjusting the signal parameter in the direction of the preset setpoint value takes place by the third assembly 4. Here, the manipulated variable acts on the signals sin, cos, –sin, –cos via the actuating members 6.1 to 6.4. The respective actuating member 6.1 to 6.4 is connected downstream of the third assembly 4, and charges the signals sin, cos, –sin, –cos with the respective defined manipulated value, so that the adjustment of the signal parameter in the direction of the predetermined setpoint value takes place in this way.

The basic arrangement of the actuating member, or the adjustable resistors for correcting the signals generated in the position measuring system, is represented in FIG. 3, which shows a portion of the signal path, or the signal channel, of the signals sin, –sin generated in the incremental position measuring system. The two adjustable resistors 6.1 and 6.2 used as actuating members for controlling the signal amplitude, and possibly the signal offset, have been connected in series with further resistors 7.1 and 7.2. Both resistors 7.1 and 7.2 are connected with a further resistor 7.3, which is connected to ground. It is possible by the resistors 7.1 to 7.3 to set the control range, as well as the sensitivity of the control of the signal offset and the signal amplitude of the output signals sin, –sin of the position measuring system. The control range for the amplitude control is here set by the selected size of the resistors 7.1 and 7.2; the step increment for the offset control is affected by the selection of the resistor 7.3.

Only the required actuating members, as well as the assigned resistors 7.1 to 7.3 for the control of the two signals sin, −sin are represented in FIG. 3; if two periodic differentiating signals, offset by 90□ from each other, are transmitted as output signals from an incremental position measuring system, i.e. if the transmission of the signal cos, −cos is additionally provided, two further actuating members, or adjustable resistors 6.3, 6.4, including further resistors for setting the control sensitivity, etc., are of course required for this portion of the signal path.

The assemblies represented without reference symbols in FIG. 3 are of no further importance in connection with the present invention, but correspond to the customary output wiring of such position measuring systems.

Based on the physical conditions in connection with scanning an incremental measuring graduation, a two-stage control for setting the signal amplitude and the signal offset of the output signals of the position measuring systems should preferably be provided in accordance with the method of the present invention. Small signal changes, which occur because of drifting during normal operation, are adjusted in a first stage. Greater amplitude fluctuations, which in particular occur because of soiling of the measuring graduation, are adjusted in a second stage. In order to be able here, too, to provide a rapid control of the signal amplitude and the signal offset, a manipulated variable of a larger value is required in the control circuit than with the amplitude and offset control during interference-free operation. Therefore two manipulated variables are preset in an advantageous embodiment of the present invention, which are clearly different in their values. Furthermore, a manipulated variable with the opposite sign exists in connection with each one of the two manipulated variables. Depending on the fluctuations of the signal amplitude, or their relative position in respect to defined threshold values, respectively one of the preset manipulated variables is selected and then has an effect on the signals.

In accordance with circuit technology, the four different manipulated variables provided in this example are shifted by the different step increments in the counters 5.1 and 5.4 used, and by their direction of counting.

By the digitized realization of the detection of the manipulated variables of the control circuit it is possible to prevent that undesired effects on the signals because of interference peaks are caused by the control.

It has been shown to be advantageous to select ten times the value of the smaller second step increment for a first larger step increment. Because of this, a balanced relationship between the most accurate possible control by the second step increment and the fastest possible control free of overshooting by the first step increment was achieved.

The takeover of the respective counts by the counters 5.1 and 5.4 into the associated interim data storage devices 5.2 and 5.5 takes place during the zero crossover of the respective associated signals, synchronized by the two synchronization signals SYNC3, SYNC1. By this it is prevented that a count is transferred into the interim data storage device while the count is in the process of changing.

In an alternative embodiment of the first exemplary embodiment of a circuit arrangement in accordance with the present invention it is possible to employ an A/D converter in place of the four components 3.1 to 3.4 and the voltage divider in the second assembly 3, which determines the difference between the setpoint value and the actual value of the signal amplitudes. This detected difference is then directly conducted to the counters 5.1, 5.4, 5.7 and 5.10 as the step increment. Based on this, the latter can compensate the deviation of the setpoint value from the actual value in a single step. In this case the control of the step increments of the counters 5.1, 5.4, 5.7 and 5.10 via four different control inputs is not necessary, because the required step increment is directly issued by the A/D converter.

Moreover, it is also possible to omit the decoders provided in the above example if, for example, the actuating members employed can be set, or adjusted, directly from the interim data storage devices via the counters.

Furthermore, in alternative variations of the method in accordance with the present invention, or of the circuit arrangement in accordance with the present invention, it is possible to provide for the setting of even more threshold values and in this way to adjust even more different manipulated variables.

In a further alternative embodiment of the described first embodiment variation of a circuit arrangement in accordance with the invention, the actuating members embodied as adjustable resistors 6.1, 6.2, 6.3 and 6.4 can be realized as amplifiers with an adjustable amplification factor. The amplification factor is then set by the respective decoder 5.3, 5.6, 5.8 or 5.11 proportionally to the counter value issued by the respective intermediate data storage device 5.2, 5.5, 5.8 or. 5.11.

While in the first exemplary embodiment of a circuit arrangement in accordance with the present invention a correction of the signal parameters signal amplitude and signal offset in the output signals from an incremental position measuring system took place, a second exemplary embodiment of a circuit arrangement in accordance with the present invention will now be described, by which a correction of the signal parameter phase position becomes possible. As already indicated above, it is possible for a deviation from the ideal phase position of 90° between the phase-shifted signals sin, cos from an incremental position measuring system to occur during measuring operations. The circuit arrangement described in what follows by FIGS. 5, 6, 7*a* to 7*c*, which is suitable for the correction in accordance with the present invention of the signal parameter phase position can, for example, be employed as a complement to the above described circuit arrangement, so that then in accordance with the present invention all relevant signal parameters can be corrected. However, it is also alternatively conceivable to only correct the phase position by the circuit arrangement described in what follows, etc.

It should moreover be pointed out that now in the second exemplary embodiment of a circuit arrangement in accordance with the present invention only two manipulated variables for adjusting the signal phase position to the desired 90° phase offset are preset, which have been selected to have equal value, but have different signs. It would of course also be possible to provide an analog variation of the first exemplary embodiment with several preset manipulated variables.

Figure 7A:
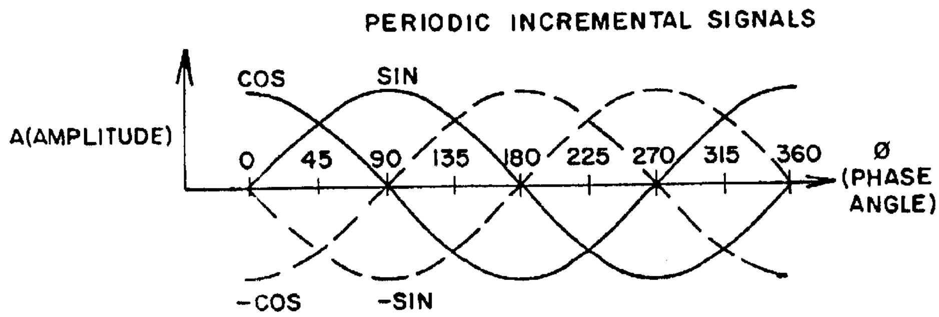
FIGS. 7*a* to 7*c* show various signals from the second exemplary embodiment of the circuit arrangement of FIG. 5 in accordance with the present invention.
Figure 7B:
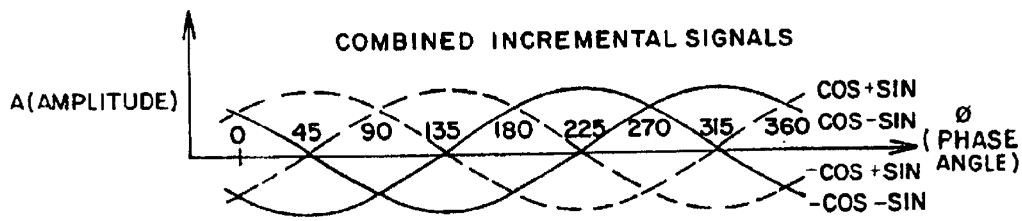

In the second exemplary embodiment of the circuit arrangement in accordance with the present invention, the four output signals sin, cos, −sin, cos, represented in FIG. 7*a*, from the incremental position measuring system are pre-processed in such a way, that the combined signals sin+cos, sin+(−cos), (−sin)+cos and (−sin)+(−cos) are individually applied to the input of the first assembly 10. The chronological path of the individual signals is represented in FIG. 7*b*. In principle, and as in the previous exemplary embodiment, processing of the input signals sin+cos, sin+(−cos), (−sin)+cos and (−sin)+(−cos) takes place in the first assembly 10, which again includes two comparators 11.2, 11.3, a direction detector 11.4, as well as a multiplexer 11.1.

Figure 7C:
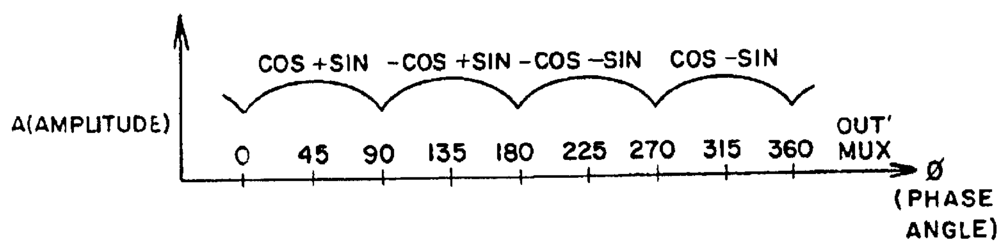

Thus, the signal OUT'MUX, represented in FIG. 7c, is applied to the output of the multiplexer 11.1, or at the output of the first assembly 10, and represents the envelope curves of the respective maximum signal half-waves of the signals sin+cos, sin+(−cos), (−sin)+cos and (−sin)+(−cos) applied to the input. As in the first exemplary embodiment, a selection of the respectively maximum half-waves of the input signals sin+cos, sin+(−cos), (−sin)+cos and (−sin)+(−cos) and the formation of the appropriate envelope curve, or of the output signal OUT'MUX, thus takes place via the first assembly 10.

The signal OUTMUX is subsequently conducted to a first input of a comparator 33 in a second assembly 30. A reference signal R is supplied to the second input. The reference signal R here corresponds to the setpoint value of the maximum signal amplitude of the signal sin+cos.

The output signals provided by the comparator 33 in the second assembly 30 are thereafter conducted in a third assembly 40 to respective inputs of two AND gates 44.1, 44.2. Synchronization signals SYNC10, SYNC20, which are generated in a fourth assembly 20, are applied to the respectively other input of the AND gates 44.1, 44.2. As in the above example, a release of the AND gates 44.1, 44.2 at defined times takes place by the synchronization signals SYNC10, SYNC20.

In this way the output signal provided by the comparator 33 is conducted in the released state to one of the two inputs V, R of a counter 45.1. Again, the counter 45.1 is designed as a customary forward-reverse counter; depending on which of the two inputs V, R is acted upon by the input signal, counting at a defined step increment takes place in the forward or reverse direction.

The respective count, or the respective counting result of the counter 45.1, is subsequently conducted to an interim data storage device 45.2 and thereafter transmitted to two decoders 45.3, 45.4. As represented, each one of the two decoders 45.3, 45.4 is assigned to a pair of signals sin, −sin, or cos, −cos. A respective actuating member 60.5, 60.5, by which the phase position of the signals sin, −sin, or cos, −cos, can be affected, is then again definitely adjusted via the decoders 45.3, 45.4. To this end it is provided to design the actuating members 60.5, 60.6 again as adjustable resistors. In this case the resistors 60.5, 60.6 each have an adjustment member for each one of the signals sin, −sin, or cos, −cos. As represented, the signal cos, or the signal −cos, is switched to respectively one end of the setpoint member 60.5; the signal sin, or the signal −sin is switched to respectively one end of the setpoint member 60.6. It is possible in this way to shift the signal sin, or −sin in regard to its phase position in the positive, as well as in the negative direction, in respect to the signal cos; this analogously applies to the signals cos, −cos in respect to the signal sin.

The simultaneous setting, or adjustment, of the phases in the processing channels for the sinusoidal or cosinusoidal signals here has the advantage that no increment displacement is registered in the course of influencing the signals by the phase relation. It is furthermore possible in this way to use the same count from the interim data storage device 45.2 for affecting the phase position in the processing channel for the cosinusoidal signals, which for this purpose is switched to the second decoder 45.5 and therefore affects the second actuating means 60.6 with the two setting elements for the signals cos, −cos.

Generation of the two synchronization signals SYNC10, SYNC20 takes place in a fourth assembly 20. The signal sin+cos is supplied to a first input of a comparator 22.1 for generating the synchronization signal SYNC10; the de voltage reference signal UM is applied to the second input of this comparator 22.1. The output signal from the first comparator 22.1 is supplied to a first OR gate 22.9 on a first signal path via a pulse duration converter 22.3. On a second signal path, the output signal from the comparator 22.1 is supplied to the OR gate 22.9 via an inverter and a pulse duration converter 22.4. Finally, the synchronization signal SYNC10 results at the output of the first OR gate and is, as described above, used for the selective release of the counter input R in the counter 45.1 at defined times.

The generation of the second synchronization signal SYNC20 from the signal sin+(−cos) takes place analogously via the comparator 22.5, the pulse duration converter 22.6, the inverter 22.2, the pulse duration converter 22.8 and the second OR gate 22.10. The second synchronization signal is used for releasing the counter input V in the counter 45.1.

Figure 6A:
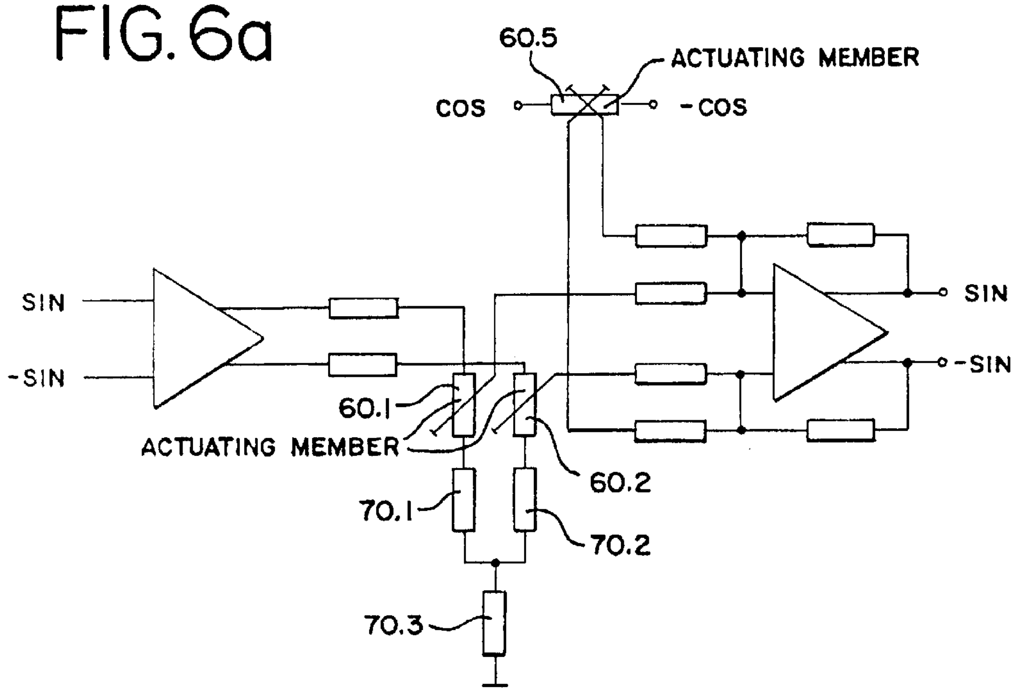
FIGS. 6*a* and 6*b*, respectively, each schematically show a circuit diagram of a second possible arrangement of actuating members operated in accordance with the present invention in the signal channels of an incremental position measuring system.
Figure 6B:
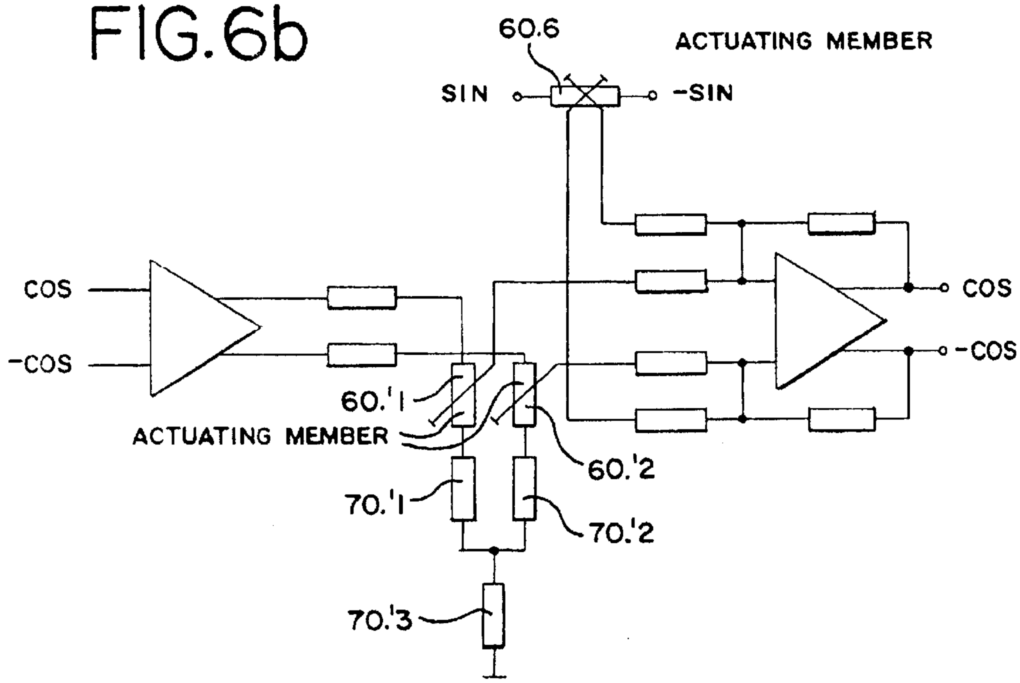

Finally, the arrangement of the actuating members 60.5, 60,6 in the signal channels of an incremental position measuring system is represented in FIGS. 6*a* and 6*b*, which are employed in the manner described for the correction of the signal parameter signal phase position in connection with the signals sin, −sin, or cos, −cos. Moreover, the various actuating members 60.1, 60.2, 60.1', 60.2' for the correction, or adjustment, of the signal parameters signal amplitude and signal offset are represented in FIGS. 6*a* and 6*b*, and operate in accordance with the above described exemplary embodiment. Thus, the correction of all relevant signal parameters of an incremental position measuring system is possible in accordance with the example in FIGS. 6*a*, 6*b*. The further elements in FIGS. 6*a*, 25' 6*b* again correspond to those from the exemplary embodiment in FIG. 3.

A number of embodiment options regarding the correction of the signals from an incremental position measuring system therefor exist within the scope of the present invention. Depending on the required signal quality, the different signal parameters can be corrected in accordance with the present invention.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A method for the correction of periodic signals from an incremental position measuring system, comprising:

determining an actual value of a signal parameter of the periodic signal;

comparing said determined actual value of said signal parameter with at least one threshold value;

determining a manipulating variable for controlling said signal parameter in a direction toward a predetermined setpoint value, wherein said manipulating variable is selected as a function of a relative position of said determined actual value of said signal parameter with respect to said at least one reference value, from at least two preset different manipulating variables that clearly differ from each other with respect to their absolute value; and applying said manipulating variable on said signal parameter for adjusting said signal parameter in said direction toward said predetermined setpoint value.

2. The method in accordance with claim 1, wherein a signal amplitude of said periodic signal is adjusted to a preset setpoint value.

3. The method in accordance with claim 1, wherein a signal offset of said periodic signal is adjusted to a preset setpoint value.

4. The method in accordance with claim 1, wherein a signal position of said periodic signal is adjusted to a preset setpoint value.

5. The method in accordance with claim 1, wherein said at least two preset manipulated variables differ from each other in their magnitude.

6. The method in accordance with claim 1, wherein said at least two preset manipulated variables differ from each other in their sign.

7. The method in accordance with claim 1, further comprising changing said manipulated variable only when an amplitude of said periodic signal is zero.

8. The method in accordance with claim 1, wherein said manipulated variable acts only for a length of one signal period of said periodic signal.

9. The method in accordance with claim 2, wherein said determining said actual value of said signal parameter comprises determining an actual value of said signal amplitude, wherein an envelope curve is formed from positive half-waves of said periodic signal from said position measuring system which have maximum signal amplitudes, and an amplitude of said envelope curve is subsequently compared with said threshold value.

10. The method in accordance with claim 3, wherein said determining said actual value of said signal parameter comprises determining an actual value of said signal offset, wherein an envelope curve is formed from positive half-waves of said periodic signal from said position measuring system which have maximum signal amplitudes, and an amplitude of said envelope curve is subsequently compared with said threshold value.

11. The method in accordance with claim 9, further comprising supplying said periodic signal to a multiplexer for forming said envelope curve.

12. The method in accordance with claim 10, further comprising supplying said periodic signal to a multiplexer for forming said envelope curve.

13. The method in accordance with claim 1, wherein said determining of said manipulated variable comprises:

selecting a counter input of at least one counter;

selecting a counting direction of said at least one counter; and selecting a step increment of said at least one counter.

14. The method in accordance with claim 13, wherein the various inputs of said at least one counter is acted upon as a function of a relative position of said actual value of said signal parameter in relation to said threshold value.

15. The method in accordance with claim 13, further comprising setting an adjustable resistor as a function of an actual count of said at least one counter for acting on said periodic signal.

16. The method in accordance with claim 13, further comprising assigning two counter inputs with different counting directions to said at least one counter.

17. The method in accordance with claim 13, further comprising assigning two counter inputs with counter step increments which clearly differ from each other to said at least one counter.

18. The method in accordance with claim 1, wherein said determining of said actual value of said signal parameter takes place within one signal period of said periodic signal.

19. The method in accordance with claim 1, wherein said method is executed until said signal parameter lies within a range of said preset setpoint value.

20. A circuit arrangement for the correction of periodic signals from an incremental position measuring system, comprising:

a first assembly comprising a multiplexer having an input to which a periodic signal is supplied and an output out of which an output signal is transmitted;

a second assembly that receives said output signal and compares said output signal with at least one preset threshold value and, said second assembly selects a manipulating variable, as a function of an actual position of a signal parameter in relation to said at least one preset threshold value, from at least two preset, different manipulating variables that clearly differ from each other with respect to their absolute value; and an actuating member that performs an action on said signal parameter in order to adjust said signal parameter in a direction toward a preset setpoint value.

21. The circuit arrangement in accordance with claim 20, wherein said multiplexer comprises a control input that is connected with an output of a comparator, and wherein said control input selectively receives said periodic signal, so that said output signal from said multiplexer represents an envelope curve with respect to maximum amplitudes of positive half-waves of said periodic signal received by said control input.

22. The circuit arrangement in accordance with claim 20, further comprising a third assembly comprising a comparator having:

an output that receives said output signal from said multiplexer; and an input that receives said preset threshold.

23. The circuit arrangement in accordance with claim 22, wherein said third assembly further comprises:

a comparator comprising an input connected with a pickup of a voltage divider that sets said threshold value, wherein said comparator compares said output signal from said multiplexer with said threshold value.

24. The circuit arrangement in accordance with claim 22, wherein said third assembly further comprises:

a comparator comprising an input that receives a reference signal, wherein said comparator compares said output signal from said multiplexer with said reference signal.

25. The circuit arrangement in accordance with claim 22, further comprising a fourth assembly comprising:

a counter comprising a first counter input and a second counter input, wherein each of said first and second counter inputs selectively receives an output signal from said third assembly so that different counting directions are preset by said first and second counter inputs.

26. A circuit arrangement for the correction of periodic signals from an incremental position measuring system, comprising:

a first assembly comprising a multiplexer having an input to which a periodic signal is supplied and an output out of which an output signal is transmitted;

a second assembly that receives said output signal and compares said output signal with at least one preset threshold value and, said second assembly selects a manipulating variable, as a function of an actual position of a signal parameter in relation to said at least one preset threshold value, from at least two preset, different manipulating variables;

a third assembly comprising a comparator having:

an output that receives said output signal from said multiplexer; and an input that receives said preset threshold;

a fourth assembly comprising:

a counter comprising a first counter input and a second counter input, wherein each of said first and second counter inputs selectively receives an output signal from said third assembly so that different counting directions are preset by said first and second counter inputs, wherein said counter further comprises a third counter input by which different counter step increments are also preset, besides a counting direction; and an actuating member that performs an action on said signal parameter in order to adjust said signal parameter in a direction toward a preset setpoint value.

27. A circuit arrangement for the correction of periodic signals from an incremental position measuring system, comprising:

a first assembly comprising a multiplexer having an input to which a periodic signal is supplied and an output out of which an output signal is transmitted;

a second assembly that receives said output signal and compares said output signal with at least one preset threshold value and, said second assembly selects a manipulating variable, as a function of an actual position of a signal parameter in relation to said at least one preset threshold value, from at least two preset, different manipulating variables;

a third assembly comprising a comparator having:

an output that receives said output signal from said multiplexer; and an input that receives said preset threshold;

a fourth assembly comprising:

a counter comprising a first counter input and a second counter input, wherein each of said first and second counter inputs selectively receives an output signal from said third assembly so that different counting directions are preset by said first and second counter inputs; and one or more AND gates that are arranged upstream of said first and second counter inputs, wherein each of said one or more AND gates comprise an input that receive an output signal from said output of said third assembly for the selective provision of said output signals of said third assembly to defined counter inputs; and an actuating, member that performs an action on said signal parameter in order to ad just said signal parameter in a direction toward a preset setpoint value.

28. A circuit arrangement for the correction of periodic signals from an incremental position measuring system, comprising:

a first assembly comprising a multiplexer having an input to which a periodic signal is supplied and an output out of which an output signal is transmitted;

a second assembly that receives said output signal and compares said output signal with at least one preset threshold value and, said second assembly selects a manipulating variable, as a function of an actual position of a signal parameter in relation to said at least one preset threshold value, from at least two preset, different manipulating variables;

a third assembly comprising a comparator having:

an output that receives said output signal from said multiplexer; and an input that receives said preset threshold;

a fourth assembly comprising:

a counter comprising a first counter input and a second counter input, wherein each of said first and second counter inputs selectively receives an output signal from said third assembly so that different counting directions are preset by said first and second counter inputs;

at least one interim data storage device that is arranged downstream of said counter and at which the respectively actual count is issued; and at least one decoder that is arranged downstream of said at least one interim data storage device and at which interim storage device values are issued; and an actuating member that performs an action on said signal parameter in order to adjust said signal parameter in a direction toward a preset setpoint value.

29. The circuit arrangement in accordance with claim 27, further comprising a fifth assembly, which can be generated by means of different synchronization signals, which synchronize the selective provision of signals to the at least two counter inputs, to which end these synchronization signals are connected with the second inputs of the AND gates.

30. The circuit arrangement in accordance with claim 28, further comprising a fifth assembly, which can be generated by means of different synchronization signals, which synchronize the selective provision of signals to the at least two counter inputs, to which end these synchronization signals are connected with the second inputs of the AND gates.

31. The circuit arrangement in accordance with claim 30, wherein said fifth assembly generates synchronization signals that are supplied to said at least one interim data storage device.

32. The circuit arrangement in accordance with claim 28, wherein said actuating member is arranged downstream of said at least one decoder, said actuating member can be adjusted proportionally with a respective count and which is arranged in a signal path of said position measuring system in such a way that said signal parameter can be adjusted to said preset setpoint value.

33. The circuit arrangement in accordance with claim 32, wherein said actuating member comprises an adjustable resistor.

34. The circuit arrangement in accordance with claim 25, wherein said counter further comprises a third counter input by which different counter step increments are also preset, besides a counting direction.

35. The circuit arrangement in accordance with claim 25, said fourth assembly further comprises:

one or more AND gates that are arranged upstream of said first and second counter inputs, wherein each of said one or more AND gates comprise an input that receive an output signal from said output of said third assembly for the selective provision of said output signals of said third assembly to defined counter inputs.

36. The circuit arrangement in accordance with claim 25, wherein said fourth assembly further comprises:

at least one interim data storage device that is arranged downstream of said counter and at which the respectively actual count is issued; and at least one decoder that is arranged downstream of said at least one interim data storage device and at which interim storage device values are issued.

37. The circuit arrangement in accordance with claim 35, further comprising a fifth assembly, which can be generated by means of different synchronization signals, which synchronize the selective provision of signals to the at least two counter inputs, to which end these synchronization signals are connected with the second inputs of the AND gates.

38. The circuit arrangement in accordance with claim 36, further comprising a fifth assembly, which can be generated by means of different synchronization signals, which synchronize the selective provision of signals to the at least two counter inputs, to which end these synchronization signals are connected with the second inputs of the AND gates.

39. The circuit arrangement in accordance with claim 38, wherein said fifth assembly generates synchronization signals that are supplied to said at least one interim data storage device.

40. The circuit arrangement in accordance with claim 36, wherein said actuating member is arranged downstream of said at least one decoder, said actuating member can be adjusted proportionally with a respective count and which is arranged in a signal path of said position measuring system in such a way that said signal parameter can be adjusted to said preset setpoint value.

41. The circuit arrangement in accordance with claim 40, wherein said actuating member comprises an adjustable resistor.

42. A method for correcting a periodic signal ill an incremental position measuring system, wherein for correction one or several signal parameters of said periodic signal are regulated to predetermined desired values via at least one actuating member, the method comprising:

a) determining an actual value of a signal parameter of said periodic signal;

b) comparing said determined actual value of said signal parameter with a predetermined value;

c) determining an actuating value for correcting said signal parameter in a direction toward said predetermined value, wherein said determined actuating value is selected from at least two predetermined different actuator value as a function of a relative position of said actual value of said signal parameter with respect to said predetermined value;

d) setting said actuating value by selecting a counter input of a counter, wherein said direction, as well as a step width of said counter, is determined by said selected counter input; and e) applying said actuating value to said signal parameter via an actuating member in order to regulate said signal parameter in said direction of said predetermined value, wherein said actuating member comprises a settable resistor, which is set to act on said periodic signal as a function of said actual counter setting.

43. The method in accordance with claim 42, wherein said signal parameter comprises either a signal amplitude or a signal offset or a signal phase relation of said periodic signal, and said signal parameter is regulated to meet said predetermined value.

44. The method in accordance with claim 42, wherein at least two predetermined actuating values are available, which differ with respect to their value and/or their sign.

45. The method in accordance with claim 42, wherein said actuating value for regulating said signal parameter only acts for one signal period on said periodic signal.

46. The method in accordance with claim 42, wherein said counter input is a function of said relative position of said actual value of said signal parameter in relation to said predetermined value.

47. The method in accordance with claim 42, wherein two counter inputs with different counting directions are assigned to said counter.

48. The method in accordance with claim 42, wherein said determining of said actual value of said signal parameter takes place within a signal period of said periodic signal.

49. The method in accordance with claim 42, wherein said method is performed until said signal parameter lies within a range of said predetermined value.

50. A circuit arrangement for correcting a periodic signal in an incremental position measuring system, wherein for correcting a signal parameter of said periodic signal said signal parameter is regulated to a predetermined desired value, said circuit arrangement comprising:

a first component comprising:

an input to which said periodic signal is applied;

an output from which an output signal is sent and wherein said first component determines an actual value of said signal parameter of said periodic signal;

a second component that receives said output signal and compares said output signal with a predetermined value, and wherein said second component selects and sets an actuating value from at least two predetermined different actuator values as a function of a relative position of said actual value with respect to said predetermined value, an actuating member comprising a settable resistor that affects said signal parameter in order to regulate said signal parameter in said direction of said predetermined value;

a counter having a counter input that sets said actuating value by selecting said counter input, wherein the counting direction, as well as the step width of the counter, is determined by said selected counter input; and wherein said settable resistor is set to act on said periodic signal as a function of an actual counter setting of said counter.

51. The circuit arrangement in accordance with claim 50, wherein said counter input is charged as a function of said relative position of said actual value of said signal parameter in relation to said predetermined value.

52. The circuit arrangement in accordance with claim 50, wherein said counter comprises a second counter input that has a counting direction that is different than a second counting direction of said counter.

53. The circuit arrangement in accordance with claim 50, further comprising a second actuating member that is switched in series with said actuating member via further resistors, wherein a regulating range, as well as a sensitivity of regulation with respect to said signal parameter is set by a selected size of said further resistors.

54. A method for correcting a periodic signal in an incremental position measuring system, wherein for correction one or several signal parameters of said periodic signal are regulated to predetermined desired values via at least one actuating member, and the method comprising:

a) determining an actual value of a signal parameter of said periodic signal;

b) comparing, said determined actual value of said signal parameter with a predetermined value;

c) determining an actuating value for correcting said signal parameter in a direction toward said predetermined value, wherein said determined actuating value is selected from at least two predetermined different actuator values as a function of a relative position of said actual value of said signal parameter in respect to said predetermined value;

d) applying said actuating value to said signal parameter via an actuating member in order to regulate said signal parameter in said direction of said predetermined value, wherein a change of said actuating value takes place only at those times in which an amplitude of said periodic signal is zero.

55. The method in accordance with claim 54, wherein said signal parameter comprises either a signal amplitude or a signal offset or a signal phase relation of said periodic signal, and said signal parameter is regulated to meet said predetermined value.

56. The method in accordance with claim 54, wherein at least two predetermined actuating values are available, which differ with respect to their value and/or their sign.

57. The method in accordance with claim 54, wherein said actuating value for regulating said signal parameter only acts for one signal period on said periodic signal.

58. The method in accordance with claim 54, wherein said determining of said actual value of said signal parameter takes place within a signal period of said periodic signal.

59. The method in accordance with claim 54, wherein said method is performed until said signal parameter lies within a range of said predetermined value.

60. A circuit arrangement for correcting a periodic signal in an incremental position measuring system, wherein correcting a signal parameter of said periodic signal to a predetermined value takes place by an actuating member, the circuit arrangement comprising:

a) a first determinator that determines an actual value of a signal parameter of said periodic signal;

b) a comparator that compares said determined actual value of said signal parameter with a predetermined value;

c) a second determinator that determines an actuating value for correcting said signal parameter in a direction toward said predetermined value, wherein said actuating value is selected from at least two predetermined different actuator values as a function of a relative position of said actual value of said signal parameter with respect to said predetermined value; and d) an actuating member that applies said actuating value on said signal parameter in order to regulate said signal parameter in a direction of said predetermined value, wherein a change of said actuating value takes place only at those times in which an amplitude of said periodic signal is zero.

61. The circuit arrangement in accordance with claim 60, wherein said signal parameter comprises either a signal amplitude or a signal offset or a signal phase relation of said periodic signal, and said signal parameter is regulated to meet said predetermined value.

62. The circuit arrangement in accordance with claim 60, wherein at least two predetermined actuating values are available, which differ with respect to their value and/or their sign.

63. The circuit arrangement in accordance with claim 60, wherein said actuating value for regulating said signal parameter only acts for one signal period on said periodic signal.

64. The circuit arrangement in accordance with claim 60, wherein said second determinator determines said actual value of said signal parameter within a signal period of said periodic signal.

* * * * *